May 5, 1936.  G. R. BROWN  2,039,678
EGG BREAKER
Filed Oct. 10, 1934    2 Sheets-Sheet 1

Inventor
Grant R. Brown
By Clarence A. O'Brien
Attorney

Inventor
Grant R. Brown

By *Clarence A. O'Brien*
Attorney

Patented May 5, 1936

2,039,678

UNITED STATES PATENT OFFICE 2,039,678

EGG BREAKER

Grant Raymond Brown, Sunbury, Pa.

Application October 10, 1934, Serial No. 747,782

1 Claim. (Cl. 146—2)

The present invention relates to an egg breaker and has for its object to provide a structure of this nature which is simple, inexpensive to manufacture, compact, easy to manipulate, efficient and reliable in use and operation and otherwise well adapted to the purpose to which it is designed.

With the above and numerous other objects in view as will appear as the description proceeds, the invention consists in certain novel features of construction, and in the combination and arrangement of parts as will be hereinafter more fully described and claimed.

Figure 1:
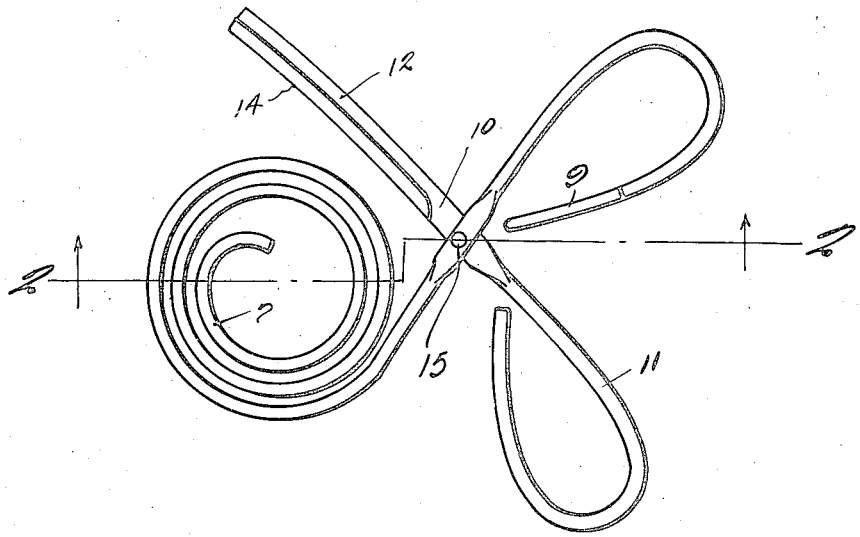
Figure 1 is a top plan view of a device embodying the features of my invention.
Figure 2:
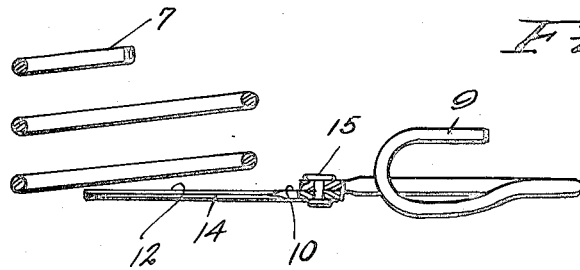
Figure 2 is a sectional view therethrough taken substantially on the line 2—2 of Figure 1.
Figure 3:
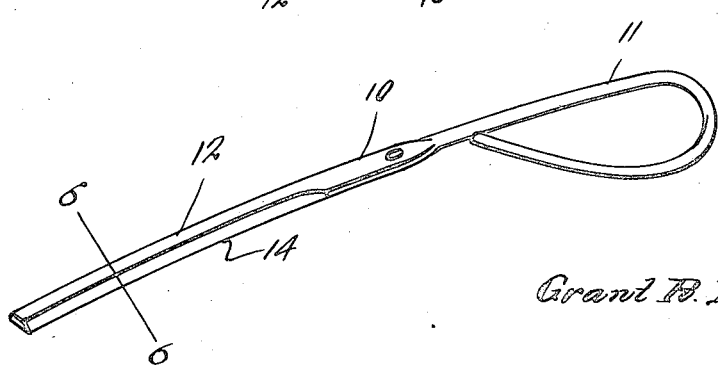
Figure 3 is a perspective view of one of the members.
Figure 4:
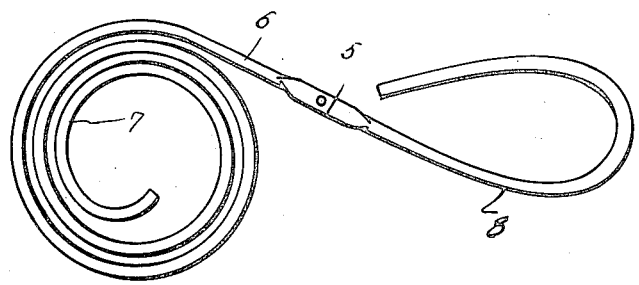
Figure 4 is a bottom plan view of the other member.
Figure 5:
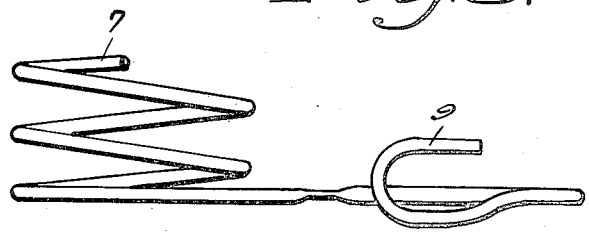
Figure 5 is a side elevation thereof.
Figure 6:
Figure 6 is an enlarged detail section taken substantially on the line 6—6 of Figure 3.

Referring to the drawings in detail it will be seen that this device is formed of two members or rods. One of the rods has an intermediate flat portion 5 from which merges at one end an extension 6 in turn merging into a helix 7 forming a holder for the egg. The other end of the portion 5 merges into an elongated loop 8 dispsed in a plane at substantial right angles to the axes of the helix 7 and terminating in an upturned overhanging extension 9. The other member includes a rod having an intermediate flat portion 10 one end of which merges into an elongated loop-like handle portion 11 adapted to be disposed in a plane in substantial parallelism with the plane of the portion 8. The other end of the portion 10 merges into a straight extension 12 having a knife-like edge 14. The portions 5 and 10 are pivotally connected together by means of a rivet or the like 15.

The pointed end of the egg is placed in the helix 7 which will accommodate practically any size egg and is held therein by one hand while the other hand engages the handle portions of the two rods so that the portion 12 is swung under the helix thereby breaking off the larger end of the egg shell and allowing the contents thereof to be released.

The handle of the first described member is bent so that the first two fingers of the right hand may be easily engaged therewith, that is the portion 9, while the thumb may be engaged in the loop 11, thereby leaving the left hand free to hold the egg during the breaking operation.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

An egg breaker of the class described comprising a pair of pivotally connected members one of which has an integral helix on one end thereof and the other of which has a straight portion with the beveled edge to swing under the helix, both members having handles in the form of elongated loops and the handle of the member provided with the helix having an extension curved over upon itself to be disposed in a plane at substantially right angles to its loops.

GRANT RAYMOND BROWN.